United States Patent
Yang

(10) Patent No.: US 8,179,700 B2
(45) Date of Patent: May 15, 2012

(54) CONTROL CIRCUIT WITH ADAPTIVE MINIMUM ON TIME FOR POWER CONVERTERS

(75) Inventor: Ta-yung Yang, Milpitas, CA (US)

(73) Assignee: Systems General Corp., Taipei Hsien (TW)

(*) Notice: Subject to any disclaimer, the term of this patent is extended or adjusted under 35 U.S.C. 154(b) by 207 days.

(21) Appl. No.: 11/605,302

(22) Filed: Nov. 29, 2006

(65) Prior Publication Data
US 2008/0123372 A1 May 29, 2008

(51) Int. Cl.
*H02M 3/335* (2006.01)
(52) U.S. Cl. .................. 363/21.16; 363/21.08
(58) Field of Classification Search .............. 363/21.16, 363/21.1, 21.08, 21.18, 15
See application file for complete search history.

(56) References Cited

U.S. PATENT DOCUMENTS

| 7,016,204 B2* | 3/2006 | Yang et al. ............... 363/21.13 |
| 7,035,122 B2* | 4/2006 | Kim et al. ................ 363/21.18 |
| 7,161,816 B2* | 1/2007 | Shteynberg et al. ....... 363/21.13 |
| 2005/0146903 A1* | 7/2005 | Yang et al. ............... 363/21.15 |
| 2007/0133231 A1* | 6/2007 | Yang et al. ................... 363/12 |
| 2008/0136393 A1* | 6/2008 | Yang et al. .................. 323/284 |

* cited by examiner

*Primary Examiner* — Harry Behm
*Assistant Examiner* — Matthew Grubb
(74) *Attorney, Agent, or Firm* — Rosenberg, Klein & Lee

(57) ABSTRACT

A control circuit includes a switch coupled to a transformer of a power converter for switching the transformer. A sampling circuit is coupled to the transformer to sample a reflected voltage of the transformer to generate a voltage signal. A switching circuit generates a switching signal to control the switch in response to the voltage signal. The minimum on time of the switching signal is changed in response to the change of an input voltage of the power converter. Because the pulse width of the reflected voltage is narrower at light load, the minimum on time of the switching signal helps the reflected voltage detection.

18 Claims, 7 Drawing Sheets

CONTROL CIRCUIT WITH ADAPTIVE MINIMUM ON TIME FOR POWER CONVERTERS

BACKGROUND OF THE INVENTION

1. Field of the Invention

The present invention relates to a power converter, and more specifically relates to a control circuit of the power converter.

2. Description of Related Art

Power converters have been widely used to provide regulated outputs. For safety, the power converter must provide galvanic isolation between its primary side and secondary side. A transformer is usually equipped to provide the isolation. FIG. 1 shows a traditional power converter having a transformer 10. The energy is stored into the transformer 10 during a switch 20 is on, in which the switch 20 can be power transistor or a power MOSFET. The energy will be discharged to the output terminal of the power converter when the switch 20 is switched off. A control circuit 25 generates a switching signal $V_G$ at an output terminal OUT of the control circuit 25 to control the on/off of the switch 20 and regulate the output of the power converter. The switch 20 is turned on when the switch signal $V_G$ is enabled.

A current-sense device 24 is connected between the switch 20 and the ground to sense a switching current $I_P$ of the transformer 10 and generate a current-sense signal $V_{CS}$ for the switching control. The current-sense device 24 can be a current-sense resistor. The current-sense device 24 is further coupled to a current-sense terminal CS of the control circuit 25 to transmit the current-sense signal $V_{CS}$ to the current-sense terminal CS. A ground terminal GND and a compensation terminal COM of the controller 25 are coupled to the ground and a compensation capacitor 26 respectively.

The transformer 10 includes a primary winding $N_P$, a secondary winding $N_S$ and an auxiliary winding $N_{AUX}$. The primary winding $N_P$ is coupled from an input voltage $V_{IN}$ to the switch 20. The secondary winding $N_S$ connects a rectifier 15. A filter capacitor 17 is coupled to the rectifier 15 and the secondary winding $N_S$. Once the switch 20 is turned off, the auxiliary winding $N_{AUX}$ will produce a reflected voltage $V_F$ correlated to the output voltage $V_O$. The reflected voltage $V_F$ can be utilized to detect the discharge time of the transformer 10 and/or feedback the output voltage $V_O$. A reflected voltage control technique has been disclosed in U.S. Pat. No. 4,302,803 "Rectifier-Converter Power Supply with Multi-Channel Flyback Inverter", issued to Randolph D. W. Shelly. However, foregoing prior art cannot measure an accuracy reflected voltage $V_F$ from the transformer 10, particularly in the light load conditions. FIG. 2 shows the voltage waveforms of the power converter in light load condition. The discharge time $T_{DS}$ of the transformer 10 can be expressed as, $$T_{DS} = \left(\frac{V_{IN}}{V_O + V_D}\right) \times \frac{W_{NS}}{W_{NP}} \times T_{ON} \quad (1)$$

where $V_{IN}$ is the input voltage of the power converter; $W_{NP}$ and $W_{NS}$ are respectively the winding turns of the primary winding $N_P$ and the secondary winding $N_S$ of the transformer 10; $V_D$ is a forward voltage drop of the rectifier 15; $T_{ON}$ is an on time of the switching signal $V_G$.

The reflected voltage $V_F$ is connected to the control circuit 25 through resistors 21 and 22 to produce a voltage-sense signal $V_{DET}$ for the reflected voltage $V_F$ detection. Since the on time $T_{ON}$ and the discharge time $T_{DS}$ are short in the light load conditions, a parasitic capacitor 23 and resistors 21, 22 forms a low pass filter that will distort the waveform of the voltage-sense signal $V_{DET}$. Normally a lower reflected voltage $V_F$ is thus detected. This drawback is the main object of the present invention to overcome.

SUMMARY OF THE INVENTION

A control circuit includes a switch for switching a transformer of a power converter and transferring the energy from the primary side to the secondary side of the transformer. A sampling circuit is coupled to the transformer to sample a reflected voltage of the transformer to generate a voltage signal in accordance with the reflected voltage. The switching circuit is used for generating a switching signal to control the switch and to regulate the output of the power converter in response to the voltage signal. A conversion circuit generates an adaptive signal correlated to an input voltage of the power converter. The adaptive signal is coupled to adjust a minimum on time of the switching signal. The minimum on time of the switching signal is inverse proportion to the input voltage of the power converter, which helps the sampling of the reflected voltage of the transformer especially at light load of the power converter.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

DESCRIPTION OF THE PREFERRED EMBODIMENTS

Figure 1:
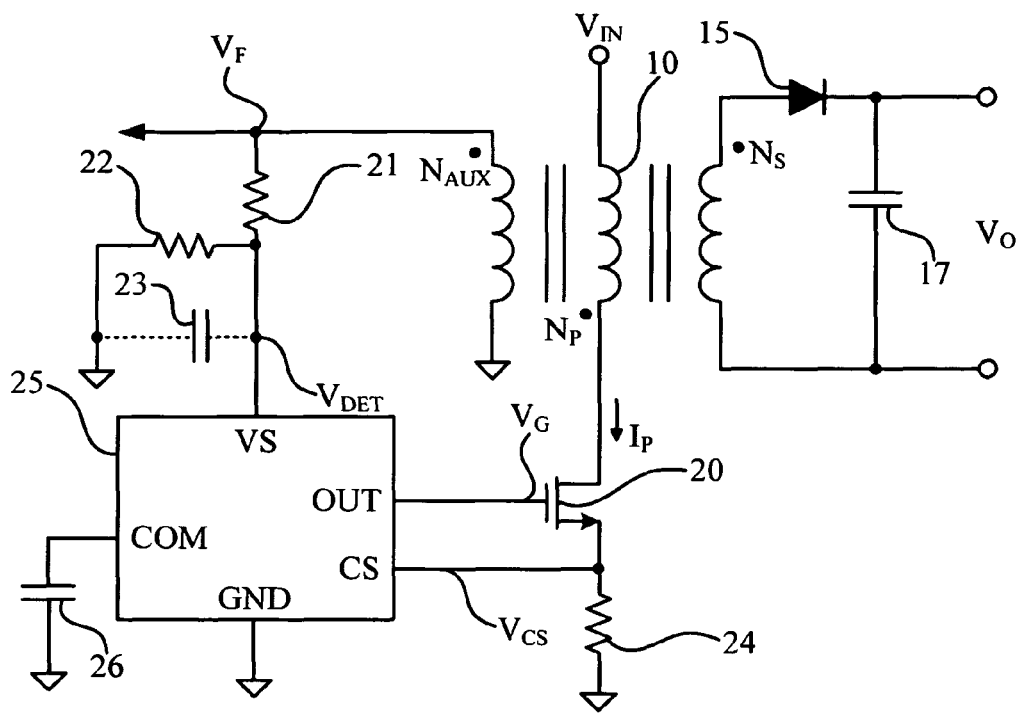
FIG. 1 shows a circuit diagram of a traditional power converter.
Figure 2:
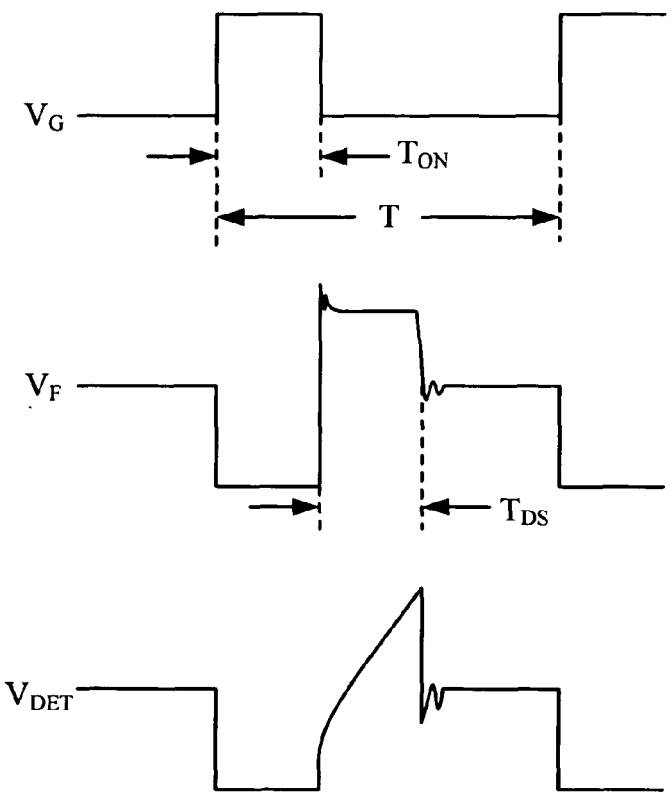
FIG. 2 shows the voltage waveforms of the traditional power converter in light load condition.
Figure 3:
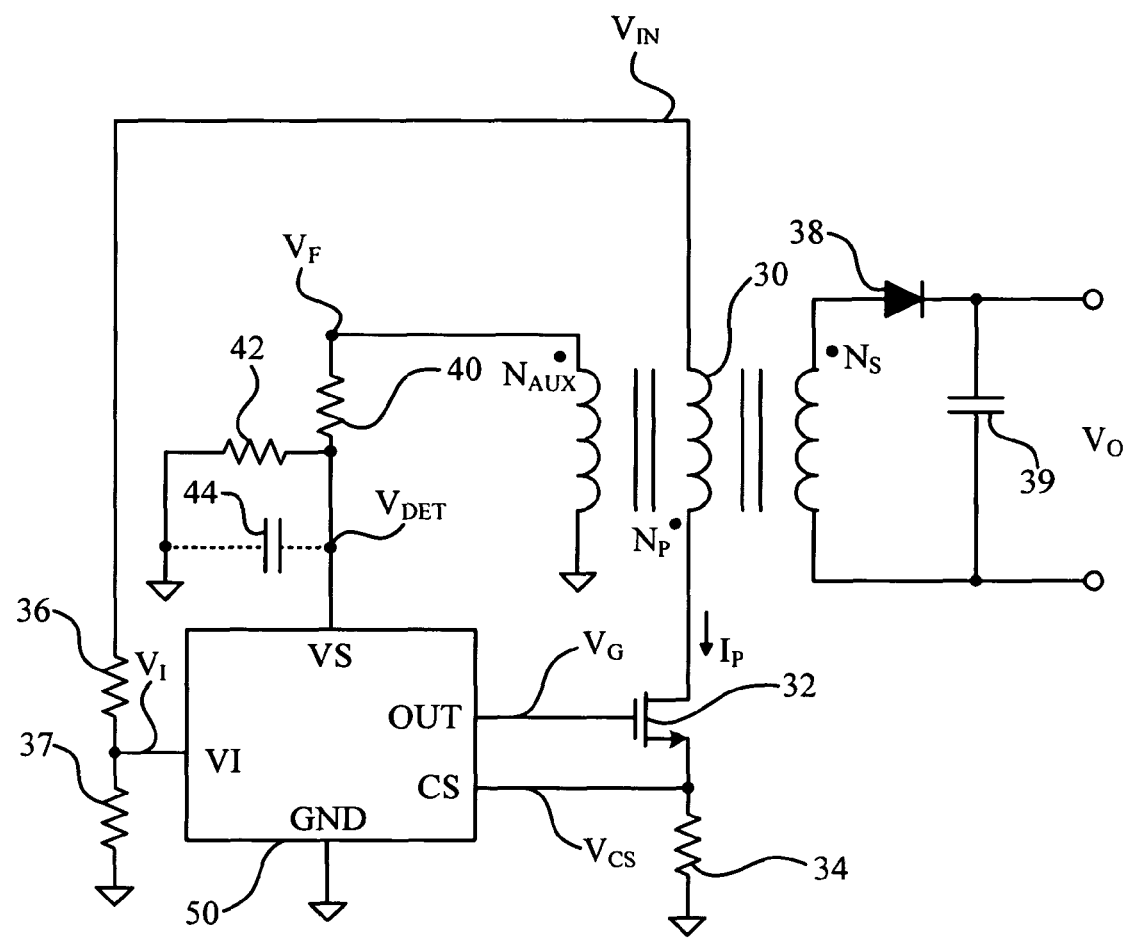
FIG. 3 shows a circuit diagram of a power converter according to a preferred embodiment of the present invention.

FIG. 3 shows a circuit diagram of a power converter according to the present invention. As shown in the FIG. 3, the power converter includes a transformer 30 having a primary winding $N_P$, a secondary winding $N_S$ and an auxiliary winding $N_{AUX}$. The primary winding $N_P$ is coupled to an input voltage $V_{IN}$ and a switch 32. The switch 32 can be a power transistor or a power MOSFET. A control circuit 50 generates a switching signal $V_G$ at an output terminal OUT to control the switch 32 and regulate the output of the power converter.

The switch 32 is turned on when the switch signal $V_G$ is enabled. A switching current $I_P$ flowed through the transformer 30 and the switch 32 will generate a current-sense signal $V_{CS}$ at a current-sense device 34, which is coupled between the switch 32 and the ground. The current-sense device 34 is a current-sense resistor. The current-sense signal $V_{CS}$ is further coupled to a current-sense terminal CS of the control circuit 50.

A resistor 36 is coupled to receive the input voltage $V_{IN}$. The resistor 36 is further coupled in series with a resistor 37. The resistor 37 is further connected to the ground. Through resistors 36 and 37, the input voltage $V_{IN}$ of the power converter is coupled to an input-sense terminal VI of the control circuit 50 to generate an input-voltage signal $V_I$ at the input-sense terminal VI. The secondary winding $N_S$ of the transformer 30 connects a rectifier 38. A filter capacitor 39 is coupled to the rectifier 38 and the secondary winding $N_S$.

A voltage-sense terminal VS of the control circuit 50 is coupled to the auxiliary winding $N_{AUX}$ of the transformer 30 to detect a reflected voltage $V_F$ of the transformer 30 through resistors 40 and 42. The reflected voltage $V_F$ can be utilized to detect the discharge time of the transformer 30 and/or feedback the output voltage $V_O$. A voltage-sense signal $V_{DET}$ is generated at the voltage-sense terminal VS of the control circuit 50. The voltage-sense signal $V_{DET}$ correlates to the reflected voltage $V_F$. A parasitic capacitor 44 is coupled to the resistor 42.

Figure 4:
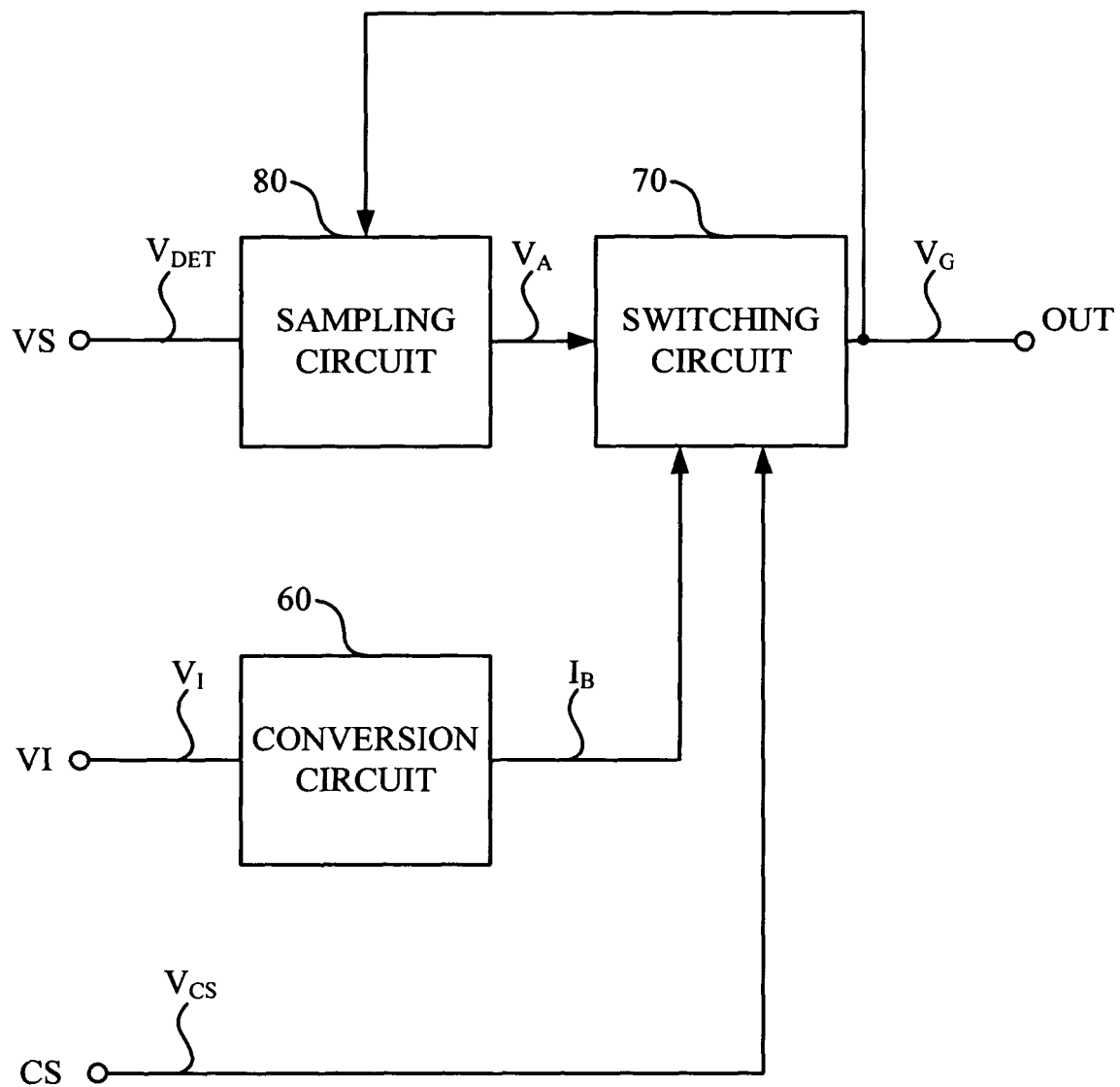
FIG. 4 shows a block diagram of a control circuit of the power converter according to a preferred embodiment of the present invention.

FIG. 4 shows a block diagram of the control circuit 50 according to the present invention. The control circuit 50 includes a conversion circuit 60, a switching circuit 70 and a sampling circuit 80. A voltage signal $V_A$ is generated by the sampling circuit 80 in accordance with the voltage-sense signal $V_{DET}$ and the switching signal $V_G$. Therefore the sampling circuit 80 generates the voltage signal $V_A$ in accordance with the reflected voltage $V_F$. The switching circuit 70 generates the switching signal $V_G$ at the output terminal OUT of the control circuit 50 in response to the voltage signal $V_A$, a adaptive signal $I_B$ and the current-sense signal $V_{CS}$. The conversion circuit 60 is utilized to generate the adaptive signal $I_B$ in response to the input-voltage signal $V_I$ divided from the input voltage $V_{IN}$. Therefore the adaptive signal $I_B$ is correlated to the input voltage $V_{IN}$ of the power converter. The adaptive signal $I_B$ is coupled to the switching circuit 70 to adjust a minimum on time of the switching signal $V_G$. The minimum on time of the switching signal $V_G$ is inverse proportion to the input voltage $V_{IN}$ of the power converter. The switching circuit 70 generates the switching signal $V_G$ to control the switch 32 and regulate the output of the power converter in response to the voltage signal $V_A$, the adaptive signal $I_B$ and the current-sense signal $V_{CS}$.

Figure 5:
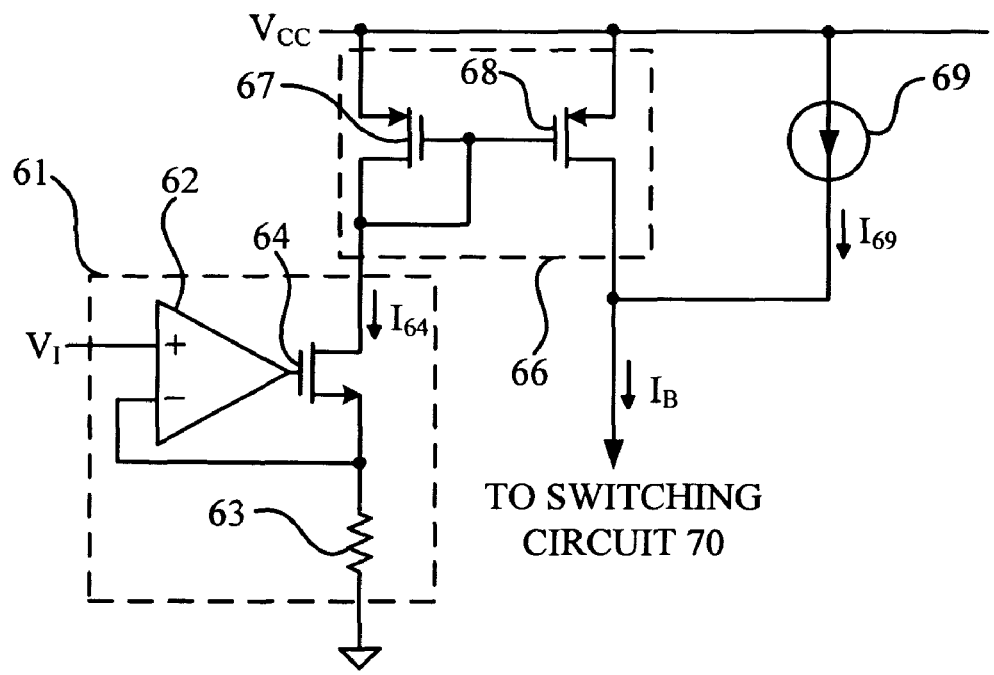
FIG. 5 shows a circuit diagram of a conversion circuit of the control circuit according to a preferred embodiment of the present invention.

FIG. 5 shows a circuit diagram of the conversion circuit 60. The conversion circuit 60 includes a voltage-to-current converter 61, a mirror circuit 66 and a current source 69. The voltage-to-current converter 61 includes an operational amplifier 62, a resistor 63 and a transistor 64 to generate a current signal $I_{64}$ at the drain of the transistor 64. The positive input terminal of the operational amplifier 62 is coupled to receive the input-voltage signal $V_I$. The negative input terminal of the operational amplifier 62 is connected to the source of the transistor 64. The output terminal of the operational amplifier 62 is coupled to the gate of the transistor 64. The drain of the transistor 64 outputs the current signal $I_{64}$. The resistor 63 is coupled between the source of the transistor 64 and the ground. Therefore the current signal $I_{64}$ is generated by the voltage-to-current converter 61 in response to the input voltage $V_{IN}$ of the power converter. The current source 69 is coupled to a supply voltage $V_{CC}$ to generate a current $I_{69}$. The mirror circuit 66 includes transistors 67 and 68 to generate the adaptive signal $I_B$ in response to the current signal $I_{64}$. The minimum value of the adaptive signal $I_B$ is determined by the current $I_{69}$ of the current source 69 and supplied to the switching circuit 70 for determining the minimum on time of the switching signal $V_G$. The sources of the transistor 67, 68 are coupled to the supply voltage $V_{CC}$. The gates of the transistor 67, 68 and the drain of the transistor 67 are coupled together. The drain of the transistor 68 outputs the adaptive signal $I_B$.

Figure 6:
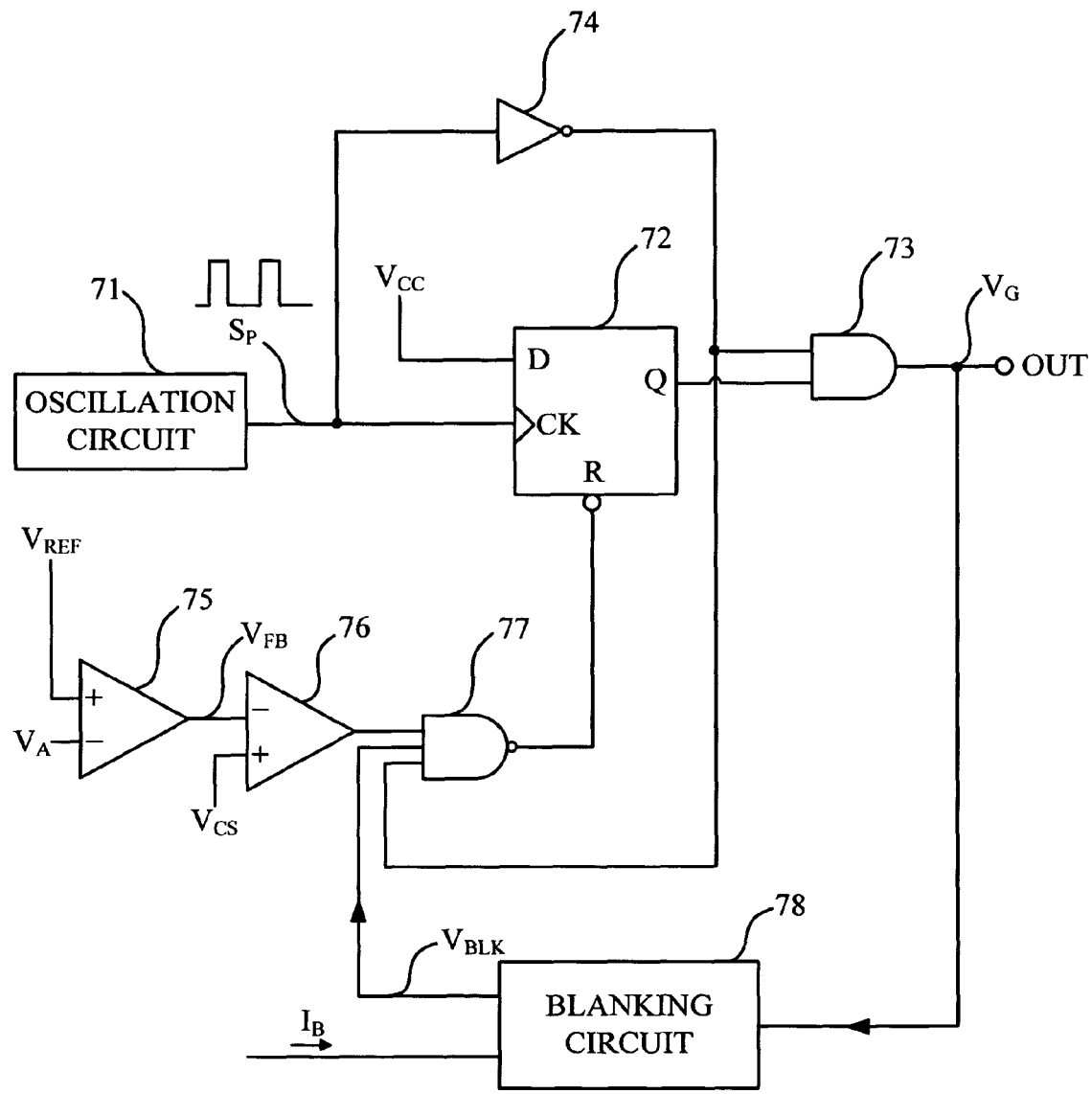
FIG. 6 shows a circuit diagram of a switching circuit of the control circuit according to a preferred embodiment of the present invention.

In one embodiment, the circuit diagram of the switching circuit 70 is shown in FIG. 6, in which an oscillation circuit 71 is utilized for producing a pulse signal $S_P$. The pulse signal $S_P$ is a periodic pulse signal. The pulse signal $S_P$ is coupled to the clock input terminal CK of a flip-flop 72 for enabling the switching signal $V_G$ through an AND gate 73. The output terminal Q of the flip-flop 72 is connected to an input terminal of the AND gate 73. An inverter 74 is coupled between the AND gate 73 and the oscillation circuit 71. Through the inverter 74, another input terminal of the AND gate 73 is coupled to receive the inversed pulse signal $S_P$ for providing a maximum on time for the switching signal $V_G$. The output terminal of the AND gate 73 produces the switching signal $V_G$ connected to the output terminal OUT of the control circuit 50. The input terminal D of the flip-flop 72 is coupled to receive the supply voltage $V_{CC}$. An error amplifier 75 is used to generate a feedback signal $V_{FB}$ in accordance with the voltage signal $V_A$ generated by the sampling circuit 80. The positive input terminal of the error amplifier 75 is coupled to receive a reference voltage $V_{REF}$ to generate the feedback signal $V_{FB}$ in accordance with the voltage signal $V_A$. The negative input terminal of the error amplifier 75 is coupled to receive the voltage signal $V_A$. The output terminal of the error amplifier 75 outputs the feedback signal $V_{FB}$. A comparator 76 is utilized for disabling the flip-flop 72 once the current-sense signal $V_{CS}$ is higher than the feedback signal $V_{FB}$. The positive input terminal and the negative input terminal of the comparator 76 are coupled to receive the current-sense signal $V_{CS}$ and the feedback signal $V_{FB}$ respectively. The output terminal of the comparator 76 is connected to the first input terminal of an NAND gate 77. The second input terminal of the NAND gate 77 is connected from the output terminal of a blanking circuit 78 to receive a blanking signal $V_{BLK}$. The third input terminal of the NAND gate 77 is coupled to receive the pulse signal $S_P$ through the inverter 74. The output terminal of the NAND gate 77 is connected to the reset terminal R of the flip-flop 72 to reset the flip-flop 72. The input of the blanking circuit 78 is supplied by the switching signal $V_G$. Besides, the adaptive signal $I_B$ is coupled to the blanking circuit 78 to adjust the minimum on time of the switching signal $V_G$.

Figure 7:
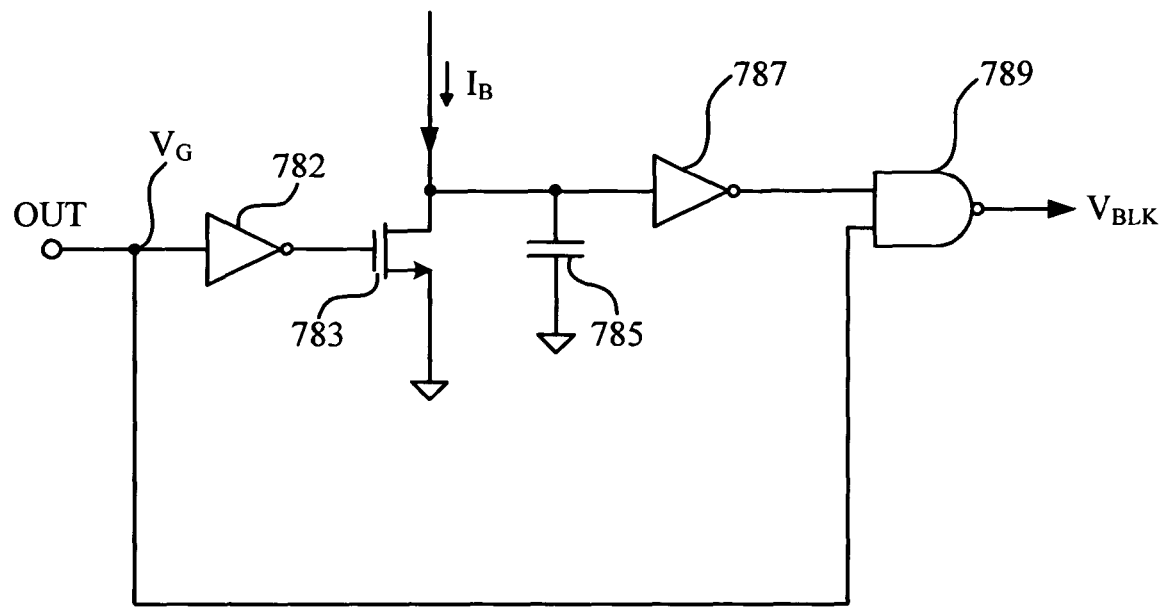
FIG. 7 shows a circuit diagram of a blanking circuit of the switching circuit according to a preferred embodiment of the present invention.

In one embodiment, the blanking circuit 78 according to the present invention is shown in FIG. 7. As shown in the FIG. 7, an inverter 782 is coupled between the output terminal OUT of the control circuit 50 and the gate of a transistor 783. Through the inverter 782, the switching signal $V_G$ is coupled to turn off the transistor 783 when the switching signal $V_G$ is enabled. The source of the transistor 783 is coupled to the ground. The drain of the transistor 783 is coupled to receive the adaptive signal $I_B$. The adaptive signal $I_B$ starts to charge a capacitor 485 once the transistor 783 is in an off state. The capacitor 785 is coupled between the drain of the transistor 783 and the ground. The capacitor 785 is further connected to an NAND gate 789 via an inverter 787. The inverter 787 is coupled between the capacitor 785 and the input terminal of the NAND gate 789. Another input terminal of the NAND gate 789 is coupled to receive the switching signal $V_G$. The output terminal of the NAND gate 789 therefore generates the blanking signal $V_{BLK}$ in response to the enabling of the switching signal $V_G$. The current of the adaptive signal $I_B$ and the capacitance of the capacitor 785 determine the pulse width of the blanking signal $V_{BLK}$. Because from the described above, the adaptive signal $I_B$ is correlated to the input voltage $V_{IN}$ of the power converter, therefore the blanking circuit 78 generates the blanking signal $V_{BLK}$ in response to the input voltage $V_{IN}$ correspondingly. The blanking signal $V_{BLK}$ further determines the minimum on time of the switching signal $V_G$ once the switching signal $V_G$ is switched on. Referring back to FIG. 3, the minimum on time of the switching signal $V_G$ further produces a minimum pulse width of the reflected voltage $V_F$. Since the minimum on time of the switching signal $V_G$ is increased in response to the decrease of the input voltage $V_{IN}$ of the power converter, the equation (1) can be rewritten as, $$\partial T_{ON} = \left(\frac{V_O + V_D}{\partial V_{IN}}\right) \times \frac{W_{NP}}{W_{NS}} \times T_{DS} \quad (2)$$

$$\partial T_{ON} = \frac{K_0}{\partial V_{IN}} \quad (3)$$

where $K_0$ is a constant.

If the change of the minimum on time of the switching signal $V_G$ is inverse proportion to the change of the input voltage $V_{IN}$, then the discharge time $T_{DS}$ of the transformer 30 can be maintained as a constant, which facilitates the reflected voltage detection.

Figure 8:
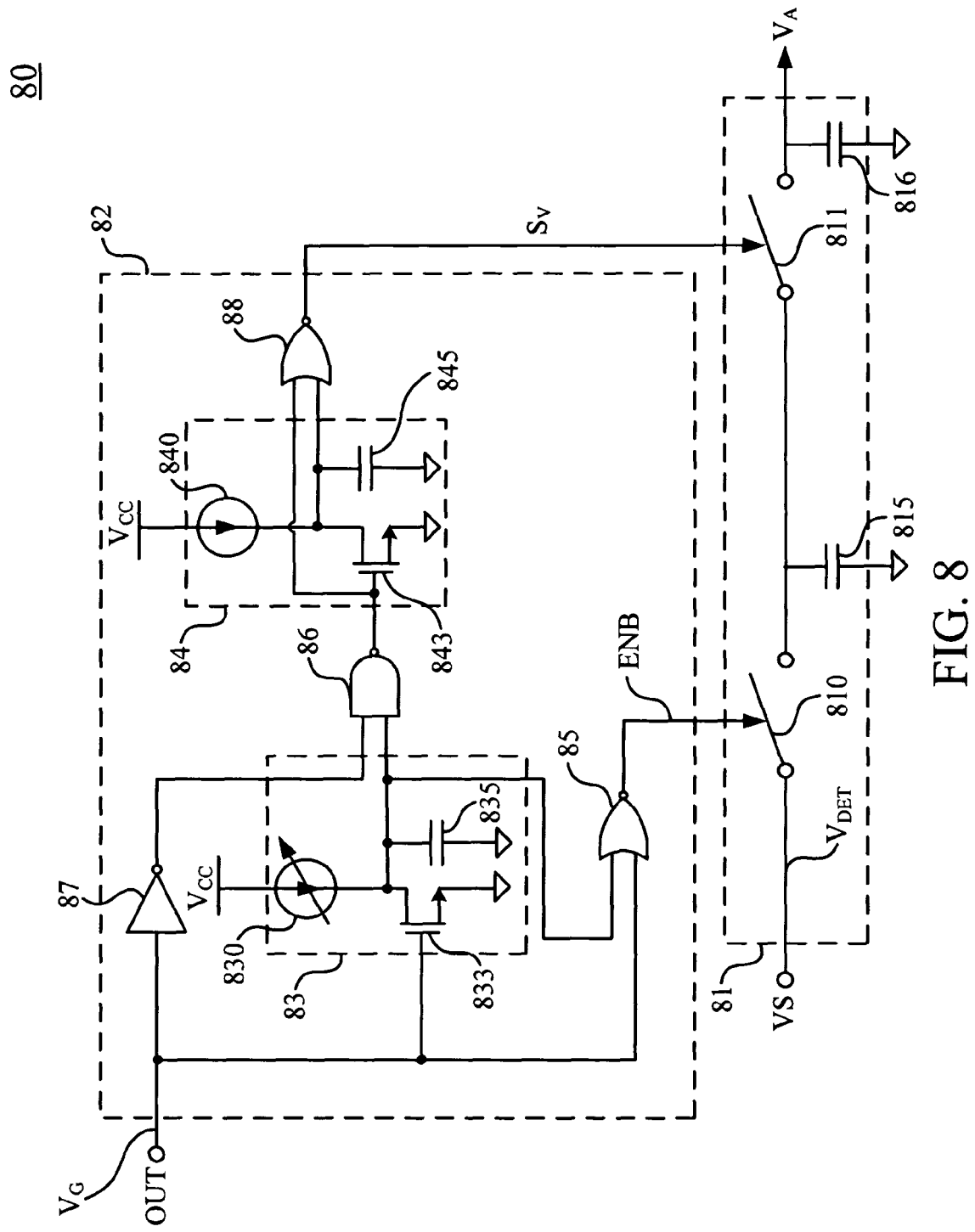
FIG. 8 shows a circuit diagram of a sampling circuit of the control circuit according to a preferred embodiment of the present invention.

FIG. 8 shows the sampling circuit 80 which includes a sample unit 81 coupled to the transformer 30 through the voltage-sense terminal VS of the control circuit 50 to generate the voltage signal $V_A$ by sampling the voltage-sense signal $V_{DET}$. It is to say, the sample unit 81 is utilized to sample the reflected voltage $V_F$ of the transformer 30. A sample-signal generation circuit 82 generates sample signals ENB and $S_v$ in response to the switching signal $V_G$. The sample signal ENB is coupled to control the sampling time of the sample unit 81. The sample-signal generation circuit 82 includes a first time-delay circuit 83 and a second time-delay circuit 84. The first time-delay circuit 83 includes a programmable current source 830, a transistor 833 and a capacitor 835 to generate a first time-delay signal at the capacitor 835.

The programmable current source 830 is coupled between the supply voltage $V_{CC}$ and the drain of the transistor 833. The source of the transistor 833 is coupled to the ground. The capacitor 835 is coupled between the drain of the transistor 833 and the ground. The switching signal $V_G$ is connected to the gate of the transistor 833 and the input terminal of an NOR gate 85. Another input terminal of the NOR gate 85 is connected to the capacitor 835. The output terminal of the NOR gate 85 generates the sample signal ENB. The first time-delay signal at the capacitor 835 is generated in response to the disabling of the switching signal $V_G$. The current of the programmable current source 830 is determined in response to the on time of the switching signal $V_G$ in order to generate the sample signals ENB and $S_v$ just before the fully demagnetizing of the transformer 30. The capacitor 835 is further connected to the input terminal of an NAND gate 86. Another input terminal of the NAND gate 86 is coupled to receive the switching signal $V_G$ inversed through an inverter 87. The inverter 87 is coupled from the output terminal OUT of the NAND gate 86. The output terminal of the NAND gate 86 is connected the input terminal of the second time-delay circuit 84 and the input terminal of an NOR gate 88.

The second time-delay circuit 84 includes a current source 840, a transistor 843 and a capacitor 845 to generate a second time-delay signal at the capacitor 845. The current source 840 is coupled from the supply voltage $V_{CC}$ to the drain of the transistor 843. The source of the transistor 843 is coupled to the ground. The gate of the transistor 843, which is the input terminal of the second time-delay circuit 84, coupled to the output terminal of the NAND gate 86. The capacitor 845 is coupled between the drain of the transistor 843 and the ground. The capacitor 845 is further connected to another input terminal of the NOR gate 88. The output terminal of the NOR gate 88 generates the sample signal $S_V$. The current of the current source 840 and the capacitance of the capacitor 845 determine the pulse width of the sample signal $S_V$.

The sample unit 81 includes switches 810, 811 and capacitors 815, 816. The switch 810 is coupled to the transformer 30 through the voltage-sense terminal VS of the control circuit 50 to sample the voltage-sense signal $V_{ET}$ to the capacitor 815, that the sample unit 81 samples the reflected voltage $V_F$ of the transformer 30. The switch 810 is controlled by the sample signal ENB. The switch 811 is coupled between the capacitor 815 and 816. The switch 811 is controlled by the sample signal $S_v$ to sample the signal of the capacitor 815 to the capacitor 816. The voltage signal $V_A$ is thus generated at the capacitor 816. The voltage signal $V_A$ is further connected to the negative input terminal of the error amplifier 75 of the switching circuit 70, as shown in FIG. 6. The error amplifier 75 including the reference voltage $V_{REF}$ is utilized to generate the feedback signal $V_{FB}$ in accordance with the voltage signal $V_A$.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A control circuit of a power converter, comprising:
   a switch coupled to a transformer for switching the transformer;
   a sampling circuit coupled to the transformer for sampling a reflected voltage of the transformer to generate a voltage signal in accordance with the reflected voltage;
   a switching circuit coupled to the sampling circuit for generating a switching signal to control the switch and to regulate the output of the power converter in response to the voltage signal;
   a conversion circuit generating an adaptive signal correlated to an input voltage of the power converter and transmitting the adaptive signal to the switching circuit;
   wherein the adaptive signal is coupled to adjust a minimum on time of the switching signal, and the minimum on time of the switching signal is inverse proportion to the input voltage of the power converter;
   wherein the sampling circuit comprises:
   a sample unit coupled to the transformer to generate the voltage signal by sampling the reflected voltage of the transformer; and
   a sample-signal generation circuit generating at least one sample signal in response to the switching signal;
   wherein the sample signal is coupled to control the sampling time of the sample unit.

2. The control circuit of the power converter as claimed in claim 1, wherein the switching circuit comprises a blanking circuit for generating a blanking signal in response to the switching signal, in which the blanking signal determines the minimum on time of the switching signal once the switching signal is switched on.

3. The control circuit of the power converter as claimed in claim 2, wherein the blanking circuit is further coupled to receive the adaptive signal to adjust the minimum on time of the switching signal.

4. The control circuit as claimed in claim 1, wherein the adaptive signal includes a minimum value to determine the minimum on time of the switching signal.

5. The control circuit of the power converter as claimed in claim 1, wherein the conversion circuit comprises:
   a voltage-to-current converter generating a current signal in response to the input voltage of the power converter;
   a current source generating a current; and
   a mirror circuit generating the adaptive signal in response to the current signal and the current of the current source;
   wherein the current of the current source determines a minimum value of the adaptive signal to determine the minimum on time of the switching signal.

6. The control circuit of the power converter as claimed in claim 1, wherein the switching circuit is further coupled to receive a current sense signal of the power converter and generates the switching signal in response to the current sense signal.

7. The control circuit of the power converter as claimed in claim 1, wherein the switch can be a power transistor or a power MOSFET.

8. A control circuit, comprising:
   a switch coupled to a transformer for switching the transformer;
   a sampling circuit coupled to the transformer to sample a reflected voltage of the transformer to generate a voltage signal;
   a switching circuit coupled to the sampling circuit to generate a switching signal to control the switch in response to the voltage signal;
   wherein a minimum on time of the switching signal is changed in response to the change of an input voltage of the power converter;
   wherein the sampling circuit comprises:
   a sample unit coupled to the transformer to generate a voltage signal by sampling the reflected voltage of the transformer; and
   a sample-signal generation circuit generating at least one sample signal in response to the switching signal;
   wherein the sample signal is coupled to control the sampling time of the sample unit, the voltage signal is used to generate the switching signal.

9. The control circuit as claimed in claim 8, wherein the switching circuit comprises a blanking circuit for generating a blanking signal in response to the switching signal, in which the blanking signal determines the minimum on time of the switching signal once the switching signal is switched on.

10. The control circuit as claimed in claim 8, further comprising a conversion circuit to generate an adaptive signal in response to the input voltage of the power converter, in which the adaptive signal is transmitted to the switching circuit to control the minimum on time of the switching signal.

11. The control circuit as claimed in claim 10, wherein the adaptive signal includes a minimum value to determine the minimum on time of the switching signal.

12. The control circuit as claimed in claim 10, wherein the conversion circuit comprises:
   a voltage-to-current converter generating a current signal in response to the input voltage of the power converter;
   a current source generating a current; and
   a mirror circuit generating the adaptive signal in response to the current signal and the current of the current source;
   wherein the current of the current source determines a minimum value of the adaptive signal to determine the minimum on time of the switching signal.

13. The control circuit as claimed in claim 8, wherein the switching circuit is further coupled to receive a current sense signal of the power converter and generates the switching signal in response to the current sense signal.

14. The control circuit as claimed in claim 8, wherein the switch can be a power transistor or a power MOSFET.

15. A control circuit, comprising:
   a switch coupled to a transformer for switching the transformer;
   a sampling circuit sampling a reflected voltage of the transformer;
   a switching circuit generating a switching signal to control the switch in response to the sampling of the reflected voltage of the transformer;
   wherein a minimum on time of the switching signal is varied in response to the change of an input voltage of the power converter;
   wherein the sampling circuit comprises:
   a sample unit coupled to the transformer for sampling the reflected voltage of the transformer; and
   a sample-signal generation circuit generating at least one sample signal;
   wherein the sample signal is coupled to control the sampling time of the sample unit.

16. The control circuit as claimed in claim 15, wherein the switching circuit comprises a blanking circuit for generating a blanking signal in response to the switching signal and the input voltage, in which the blanking signal determines the minimum on time of the switching signal once the switching signal is switched on.

17. The control circuit as claimed in claim 15, wherein the switch can be a power transistor or a power MOSFET.

18. The control circuit as claimed in claim 15, further comprising a conversion circuit to generate an adaptive signal in response to the input voltage of the power converter, in which the adaptive signal is transmitted to the switching circuit to control the minimum on time of the switching signal;
   wherein the conversion circuit comprises:
   a voltage-to-current converter generating a current signal in response to the input voltage of the power converter;
   a current source generating a current; and
   a mirror circuit generating the adaptive signal in response to the current signal and the current of the current source;
   wherein the current of the current source determines a minimum value of the adaptive signal to determine the minimum on time of the switching signal.

* * * * *

UNITED STATES PATENT AND TRADEMARK OFFICE
CERTIFICATE OF CORRECTION

| | | |
|---|---|---|
| PATENT NO. | : 8,179,700 B2 | |
| APPLICATION NO. | : 11/605302 | |
| DATED | : May 15, 2012 | |
| INVENTOR(S) | : Ta-yung Yang et al. | |

It is certified that error appears in the above-identified patent and that said Letters Patent is hereby corrected as shown below:

THE TITLE PAGE:
ITEM [73] DELETE THE ASSIGNEE NAME "SYSTEMS GENERAL CORP." AND INSERT THEREFOR --SYSTEM GENERAL CORP.--

Signed and Sealed this
Eighteenth Day of September, 2012

David J. Kappos
*Director of the United States Patent and Trademark Office*

UNITED STATES PATENT AND TRADEMARK OFFICE
Certificate

Patent No. 8,179,700 B2　　　　　　　　　　　　　　　　　　　　　　　　Patented: May 15, 2012

On petition requesting issuance of a certificate for correction of inventorship pursuant to 35 U.S.C. 256, it has been found that the above identified patent, through error and without any deceptive intent, improperly sets forth the inventorship.
　Accordingly, it is hereby certified that the correct inventorship of this patent is: Ta-yung Yang, Milpitas, CA (US); Chun-Ching Li, Taoyuan County (TW); Feng-Cheng Tsao, Pingtung County (TW); and Ying-Chieh Su, Taipei County (TW).

Signed and Sealed this Twelfth Day of February 2013.

*MONICA LEWIS*
*Supervisory Patent Examiner*
*Art Unit 2838*
*Technology Center 2800*